United States Patent
Kumabe et al.

(10) Patent No.: US 9,734,087 B2
(45) Date of Patent: Aug. 15, 2017

(54) APPARATUS AND METHOD FOR CONTROLLING SHARED CACHE OF MULTIPLE PROCESSOR CORES BY USING INDIVIDUAL QUEUES AND SHARED QUEUE

(71) Applicant: FUJITSU LIMITED, Kawasaki-shi, Kanagawa (JP)

(72) Inventors: Takuro Kumabe, Kawasaki (JP); Akihito Kobayashi, Kawasaki (JP); Motohiro Sakai, Nerima (JP); Shinichiro Matsumura, Kawasaki (JP); Takahiro Ohyama, Kawasaki (JP)

(73) Assignee: FUJITSU LIMITED

( * ) Notice: Subject to any disclaimer, the term of this patent is extended or adjusted under 35 U.S.C. 154(b) by 0 days.

(21) Appl. No.: 14/636,825

(22) Filed: Mar. 3, 2015

(65) Prior Publication Data

US 2015/0278114 A1 Oct. 1, 2015

(30) Foreign Application Priority Data

Mar. 28, 2014 (JP) .................... 2014-070320

(51) Int. Cl.
 *G06F 12/122* (2016.01)
 *G06F 12/084* (2016.01)
 *G06F 12/0817* (2016.01)

(52) U.S. Cl.
 CPC .......... *G06F 12/122* (2013.01); *G06F 12/084* (2013.01); *G06F 12/0822* (2013.01); *G06F 2212/314* (2013.01); *G06F 2212/69* (2013.01)

(58) Field of Classification Search
 None
 See application file for complete search history.

(56) References Cited

U.S. PATENT DOCUMENTS

| | | | |
|---|---|---|---|
| 6,728,837 B2 * | 4/2004 | Wilkes ............... | G06F 12/122 711/133 |
| 6,839,809 B1 * | 1/2005 | Forster ............... | G06F 12/122 707/E17.12 |
| 6,877,065 B2 * | 4/2005 | Galbraith ........... | G06F 12/0866 711/113 |

(Continued)

FOREIGN PATENT DOCUMENTS

| | | |
|---|---|---|
| JP | 2006-99802 | 4/2006 |
| JP | 2007-334752 | 12/2007 |

OTHER PUBLICATIONS

Jim Handy, "The Cache Memory Book: The Authoritative Reference on Cache Design", Second Edition, Academic Press, 1998, pp. 56-57 and 210-211.*

*Primary Examiner* — Christopher D Birkhimer
(74) *Attorney, Agent, or Firm* — Fujitsu Patent Center (57) ABSTRACT

A control unit stores data used in a process to a shared cache memory. The control unit provides a shared queue in a memory space of the shared cache memory and performs LRU control with the use of the shared queue. The control unit also provides a local queue in the memory space of the shared cache memory. The control unit enqueues a CBE (management information) for a cache page used by a core in a process to the local queue. The control unit dequeues a plurality of CBEs from the local queue upon satisfaction of a predetermined condition, and enqueues the dequeued CBEs to the shared queue.

9 Claims, 12 Drawing Sheets

(56) References Cited

U.S. PATENT DOCUMENTS

| | | | | |
|---|---|---|---|---|
| 7,523,263 B2* | 4/2009 | Wintergerst | ......... | G06F 12/084 711/130 |
| 7,552,284 B2* | 6/2009 | Petev | ................... | G06F 12/122 711/100 |
| 7,752,395 B1* | 7/2010 | Fair | ................... | G06F 12/0866 711/133 |
| 7,809,891 B2* | 10/2010 | Schreter | ................... | G06F 9/52 711/130 |
| 7,831,772 B2* | 11/2010 | Nalawade | ......... | G06F 12/0871 707/736 |
| 7,908,439 B2* | 3/2011 | Brunheroto | ........ | G06F 12/0862 711/133 |
| 7,996,615 B2* | 8/2011 | Galchev | ............... | G06F 12/084 707/813 |
| 8,176,255 B2* | 5/2012 | Knebel | ................ | G06F 12/121 711/128 |
| 8,190,825 B2* | 5/2012 | Hikichi | .............. | G06F 12/0855 711/137 |
| 8,364,904 B2* | 1/2013 | Blake | ................... | G06F 12/084 711/141 |
| 2003/0097531 A1* | 5/2003 | Arimilli | ............. | G06F 12/0831 711/146 |
| 2004/0039880 A1* | 2/2004 | Pentkovski | ........ | G06F 12/0811 711/146 |
| 2006/0143256 A1* | 6/2006 | Galchev | ............... | G06F 12/084 |
| 2006/0143385 A1* | 6/2006 | Wintergerst | ......... | G06F 12/084 711/130 |
| 2006/0143393 A1* | 6/2006 | Petev | ................... | G06F 12/122 711/133 |
| 2006/0248285 A1* | 11/2006 | Petev | ................... | G06F 12/084 711/141 |
| 2007/0294475 A1 | 12/2007 | Kobayashi et al. | | |
| 2008/0250203 A1* | 10/2008 | Schreter | ................... | G06F 9/52 711/117 |
| 2009/0019219 A1* | 1/2009 | Magklis | ............. | G06F 12/0833 711/105 |
| 2009/0106494 A1* | 4/2009 | Knebel | ................ | G06F 12/128 711/119 |
| 2010/0138607 A1* | 6/2010 | Hughes | ............... | G06F 12/0828 711/121 |
| 2010/0268881 A1* | 10/2010 | Galchev | ............... | G06F 12/084 711/121 |
| 2011/0022805 A1* | 1/2011 | Schreter | ................... | G06F 9/52 711/136 |
| 2011/0314227 A1* | 12/2011 | Blake | ................... | G06F 12/127 711/130 |
| 2012/0215986 A1* | 8/2012 | Schreter | ................... | G06F 9/52 711/136 |
| 2013/0339624 A1* | 12/2013 | Sugizaki | ............. | G06F 12/0804 711/136 |

* cited by examiner

APPARATUS AND METHOD FOR CONTROLLING SHARED CACHE OF MULTIPLE PROCESSOR CORES BY USING INDIVIDUAL QUEUES AND SHARED QUEUE

CROSS-REFERENCE TO RELATED APPLICATION

This application is based upon and claims the benefit of priority of the prior Japanese Patent Application No. 2014-070320, filed on Mar. 28, 2014, the entire contents of which are incorporated herein by reference.

FIELD

The embodiments discussed herein are related to a control apparatus and a control method.

BACKGROUND

In recent years, SMP (Symmetric Multiprocessing) has been widely used for faster processing. The SMP is intended to share and manage a physical memory, and provide a cache in a DRAM to perform cache control by LRU (Least Recently Used) method (LRU control), for example.

On the LRU control, each of cores in a CPU (central processing unit) connects a management block for a cache page used in a process to the tail end of an LRU link. The LRU link is a queue structure in which each of management blocks has the IDs of management blocks connected before and after the management block to hold a link relationship. Thus, each of the management blocks is connected to the LRU link by reading the management block pointed to by an MRU (Most Recently Used) pointer and updating the IDs of the management blocks connected before and after the pointed management block.

When the management block pointed to by the MRU pointer is saved in a CPU cache (local cache), each of the cores reads the management block pointed to by the MRU pointer from the CPU cache. This process is called CPU cache hit, which allows each of the cores to reconnect the management blocks to the link at faster speeds.

Japanese Laid-open Patent Publication No. 2006-99802

Japanese Laid-open Patent Publication No. 2007-334752

On the other hand, when the management block pointed to by the MRU pointer is not saved in the CPU cache, each of the cores needs to read the management block pointed to by the MRU pointer from the DRAM cache, which results in deterioration of processing performance.

When the cores perform processes in parallel, the management blocks for cache pages used in the process performed by one core are not necessarily connected to the LRU link in a consecutive manner. In addition, the probability that such management blocks are consecutively connected to the LRU link becomes lower with increase in the number of cores. In light of recent years' trend toward increase in the number of cores, the problem with failure of CPU cache hit tends to be more prominent.

SUMMARY

According to one aspect, there is provided a control apparatus including a processor that has two or more cores with local cache memories and a shared cache memory that is shared between the cores, wherein the processor performs a procedure including: enqueuing management information for unit data used in a process executed by the core and stored in the shared cache memory to a local queue assigned to the core, dequeuing a plurality of pieces of the management information from the local queue, and enqueuing the dequeued management information to a shared queue that is shared between the two or more cores.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a control apparatus in a first embodiment;

FIG. 2 illustrates an example of a storage system in a second embodiment;

FIG. 3 illustrates an example of a hardware configuration of a RAID device in the second embodiment;

FIG. 4 illustrates an example of a processor in the second embodiment;

FIG. 5 illustrates an example of a memory space in a DRAM in the second embodiment;

FIG. 6 illustrates an example of a management block data structure in the second embodiment;

FIG. 7 illustrates an example of a CBE link in the second embodiment;

FIG. 8 illustrates an example of a cache hit in a cache memory occupied by a core in the second embodiment;

FIG. 9 illustrates a comparative example of a cache miss in a cache memory occupied by a core in the case where no individual management area is provided for each of cores;

FIG. 10 illustrates an example of reconnection of management blocks from an individual management area to a shared management area in the second embodiment;

FIG. 11 illustrates a flowchart of a host I/O process in the second embodiment; and FIG. 12 illustrates a flowchart of an LRU reconnection process in the second embodiment.

DESCRIPTION OF EMBODIMENTS

Several embodiments will be described below with reference to the accompanying drawings, wherein like reference numerals refer to like elements throughout.

First Embodiment

First, a control apparatus in a first embodiment will be described with reference to FIG. 1. FIG. 1 illustrates an example of the control apparatus in the first embodiment.

The control apparatus 1 includes a processor 2 and a shared cache memory 7. The processor 2 is a multi-core processor with a plurality of cores 3, a core 3*a* and a core 3*b*. Each of the cores 3 includes a local cache memory 4. The core 3*a* includes a local cache memory 4*a*, and the core 3*b* includes a local cache memory 4*b*. The local cache memory 4 is a cache memory prepared for each of the cores 3.

The shared cache memory 7 is a cache memory shared between the plurality of cores 3. The shared cache memory 7 is provided in a DRAM (Dynamic Random Access Memory), for example.

The control apparatus 1 includes a control unit 8. The control unit 8 is realized by the processor 2 to execute a desired process. The processor 2 executes processes in each of the cores 3. The control unit 8 stores the data used in the processes as cache pages (unit data) in the shared cache memory 7. When there is no free space in the shared cache memory 7, the control unit 8 ejects already stored cache pages from the shared cache memory 7. Specifically, the control unit 8 ejects the cache pages by the LRU method to replace the data that has not been used for the longest time.

The control unit 8 provides a shared queue 6 in the memory space of the shared cache memory 7 to perform LRU control with the use of the shared queue 6. The control unit 8 also provides a local queue 5 in the memory space of the shared cache memory 7. Alternatively, the local queue 5 may be provided in the memory space of the local cache memory 4.

Each of the cores 3 accesses the shared queue 6 and the local queue 5 assigned to the core 3. For example, the core 3*a* accesses the shared queue 6 and a local queue 5*a*, and the core 3*b* accesses the shared queue 6 and a local queue 5*b*.

The control unit 8 enqueues (connects) management information for cache pages used by the cores 3 in processes (hereinafter, referred to as CBEs (Cache Bundle Elements) 9) to the local queues 5. Each of CBEs 9 includes information for connections with preceding and following CBEs 9 in the local queue 5 or the shared queue 6.

When a CBE 9 to be connected is already located in the local queue 5, the control unit 8 temporarily disconnects the CBE 9 and reconnects the same to the tail end of the local queue 5. Therefore, to connect the CBE 9 to the local queue 5, the control unit 8 needs to make access to the CBEs 9 before and after the CBE 9 to be connected. Specifically, when disconnecting the CBE 9 from the local queue 5 or connecting the CBE 9 to the local queue 5, the control unit 8 refers to the preceding and following CBEs 9 to update connection information. Although the foregoing description is given as to the local queue 5, the same thing is applicable to the shared queue 6.

When a new CBE 9 for a cache page used by the core 3 in a process is to be connected to the local queue 5, the CBE 9 already connected to the tail end of the local queue 5 is also a CBE 9 for a cache page used by the core 3 in a process, and thus the CBE 9 at the tail end is expected to be located in the local cache memory 4. Specifically, when a new CBE 9 for a cache page used by the core 3 in a process is to be connected to the local queue 5, the CBE 9 already connected to the tail end of the local queue 5 may be read from the local cache memory 4. That is, the core 3 has hit the local cache, which contributes to improvement of the core 3 in processing performance.

For example, when a new CBE 90 for a cache page used by the core 3*a* in a process is to be connected to the local queue 5*a*, a CBE 91 is expected to be located in the local cache memory 4*a*. Similarly, when a new CBE 93 for a cache page used by the core 3*b* in a process is to be connected to the local queue 5*b*, a CBE 94 is expected to be located in the local cache memory 4*b*. In such a manner, the local queue 5*a* accumulates a CBE group 92 of a plurality of CBEs 9. Similarly, the local queue 5*b* accumulates a CBE group 95 of a plurality of CBEs 9.

When a predetermined condition is satisfied, the control unit 8 dequeues a plurality of CBEs 9 from the local queue 5 and enqueues the same to the shared queue 6. For example, when the local queue 5 has a predetermined number of CBEs 9, the control unit 8 enqueues collectively these CBEs to the shared queue 6. That is, the local queue 5 serves as a buffer for each of the cores 3 relative to the shared queue 6.

For example, the CBE group 92 is reconnected from the local queue 5*a* to the shared queue 6 upon the satisfaction of the predetermined condition. The shared queue 6 thus accumulates the CBE group 92 after the CBE group 96. The CBE group 95 is located in the local queue 5*b* before the satisfaction of the predetermined condition. The shared queue 6 has the CBEs connected in such a manner that the CBE groups are aligned for each of the cores 3. For example, the shared queue 6 accumulates the CBE group 92 after the CBE group 96.

Accordingly, the control apparatus 1 improves the cache hit ratio in the local cache memory 4. By the improvement of the cache hit ratio in the local cache memory 4, the control apparatus 1 also improves the processing performance of the processor.

Second Embodiment

Figure 1:
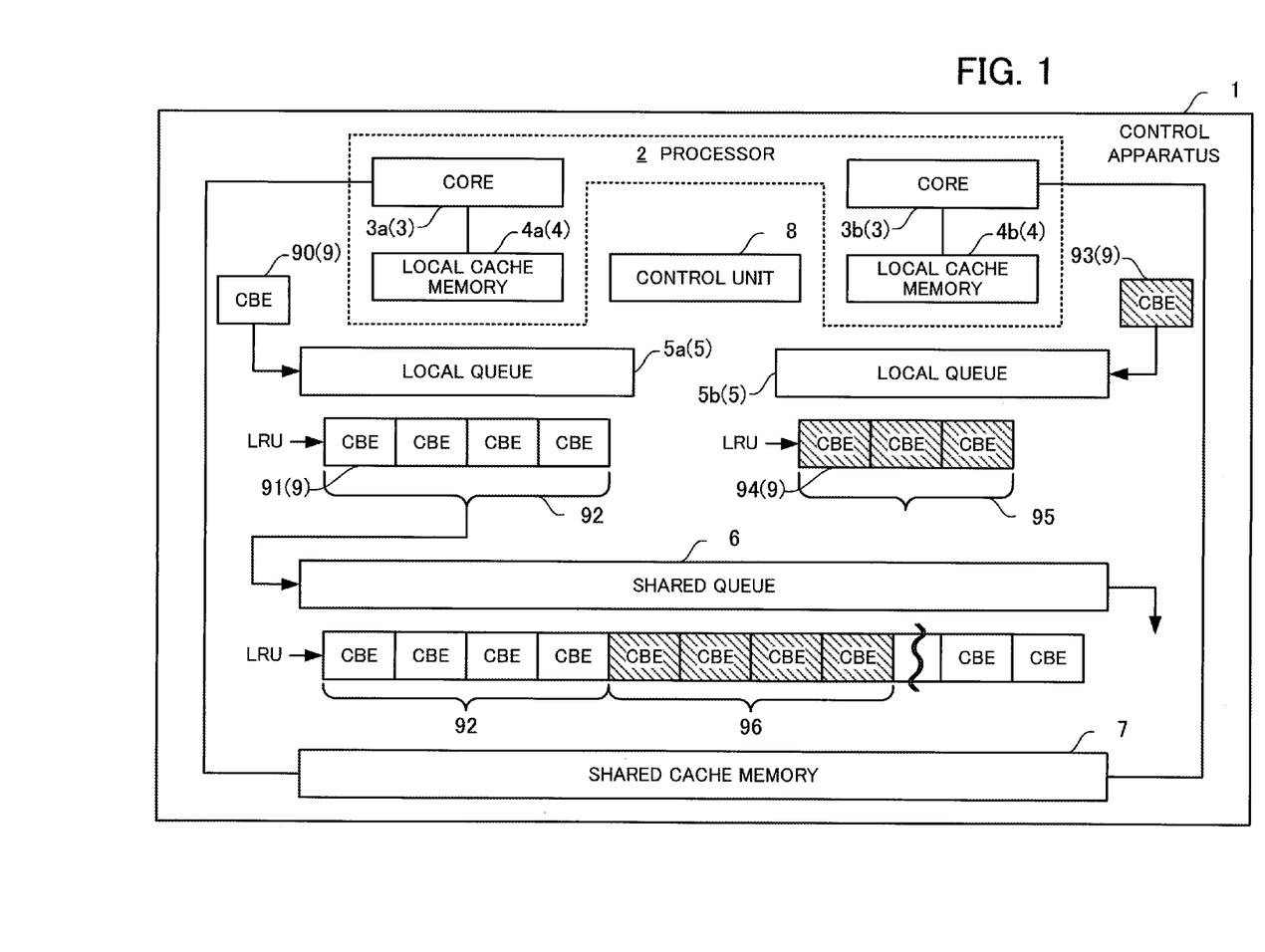
Figure 2:
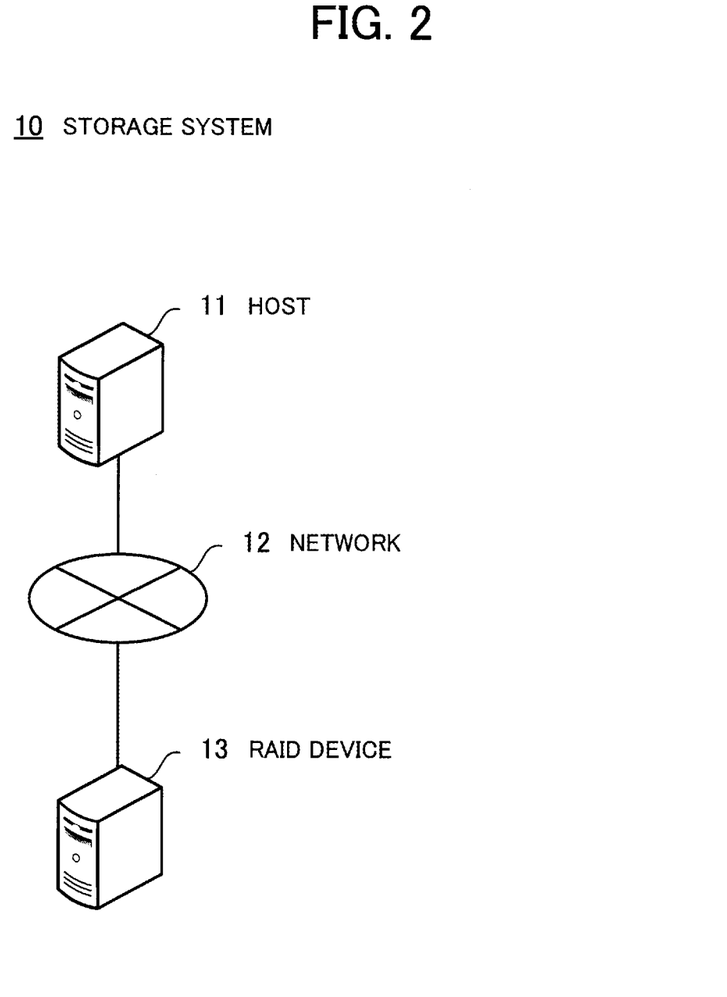

Next, a storage system in a second embodiment will be described with reference to FIG. 2. FIG. 2 illustrates an example of the storage system in the second embodiment.

A storage system 10 includes a host 11 and a RAID (Redundant Arrays of Inexpensive Disks) device 13 connected to the host 11 via a network 12. The storage system 10 writes data into the RAID device 13 or reads data from the RAID device 13 according to an I/O (Input/Output) request from the host 11.

Figure 3:
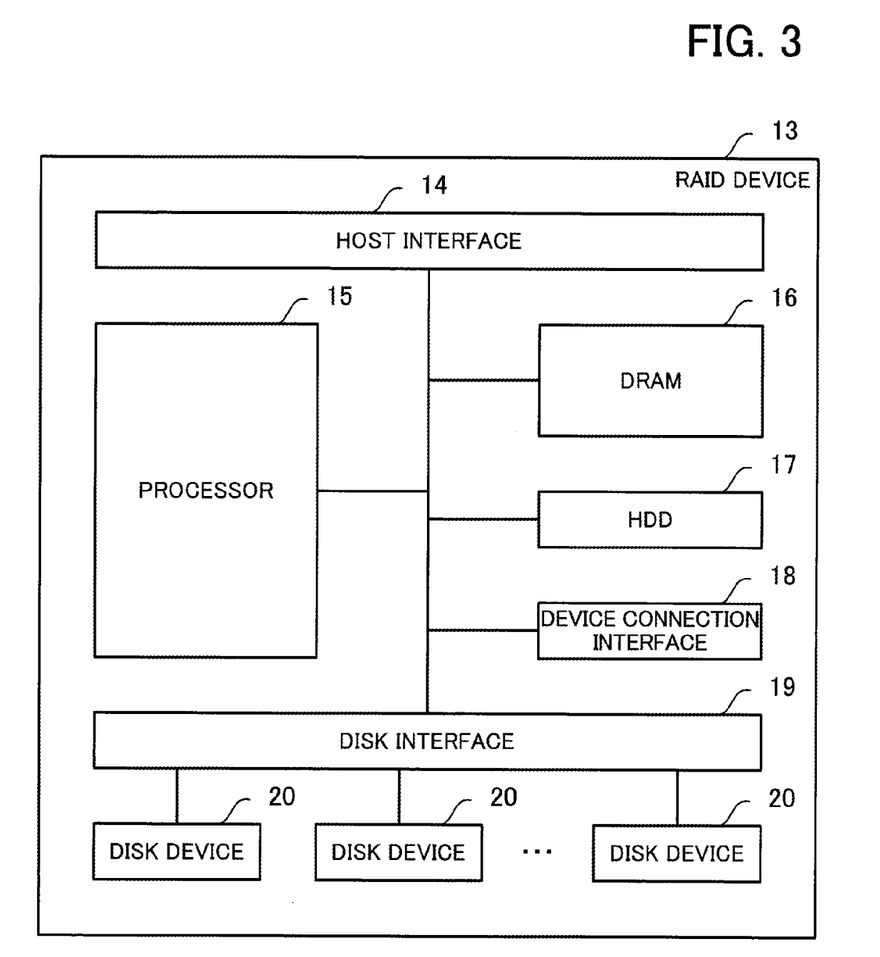

Next, a hardware configuration of the RAID device 13 in the second embodiment will be described with reference to FIG. 3. FIG. 3 illustrates an example of a hardware configuration of the RAID device in the second embodiment.

The RAID device 13 is entirely controlled by a processor 15. The processor 15 is connected via a bus to a DRAM 16 and a plurality of peripherals. The processor 15 is a multi-core processor.

The processor 15 may be a CPU, a MPU (Micro Processing Unit), a DSP (Digital Signal Processor), an ASIC (Application Specific Integrated Circuit), or a PLD (Programmable Logic Device), for example.

The DRAM 16 is used as a main storage unit of the RAID device 13. The DRAM 16 temporarily stores an OS (Operating System) program and at least some of application programs to be executed by the processor 15. The DRAM 16 also stores various data used by the processor 15 to execute processes. The DRAM 16 also serves as a cache memory for the processor 15.

The peripherals connected to the bus include a host interface 14, an HDD 17, a device connection interface 18, and a disk interface 19.

The host interface 14 exchanges data with the host 11 via the network 12.

The HDD 17 magnetically writes data into an integral disk or reads data from the same. The HDD 17 is used as an auxiliary storage unit of the RAID device 13. The HDD 17 stores an OS program, application programs, and various data. The auxiliary storage unit may be a semiconductor storage unit such as a flash memory.

The device connection interface 18 is a communication interface for connection of peripheral devices to the RAID device 13. For example, the device connection interface 18 may be connected to a memory device or a memory reader/writer not illustrated. The memory device is a storage medium with the function of communications with the device connection interface 18. The memory reader/writer is a device that writes data into a memory card or reads data from the same. The memory card is a card-type storage medium, for example.

The device connection interface 18 may also be connected to a monitor not illustrated. In that case, the device connection interface 18 has the graphic processing function to display images on the monitor screen according to commands from the processor 15.

The device connection interface 18 may also be connected to a keyboard or a mouse not illustrated. In that case, the device connection interface 18 transmits signals from the keyboard or the mouse to the processor 15. The mouse is one example of a pointing device, and any other pointing device may be used. The other pointing device may be a touch panel, a tablet, a touch pad, a trackball, or the like.

The device connection interface 18 may also be connected to an optical drive device not illustrated. The optical drive device reads data from an optical disc using laser light or the like. The optical disc is a portable storage medium that records data in such a manner as to be readable by light reflection. The optical disc may be a DVD (Digital Versatile Disc), a DVD-RAM, a CD-ROM (Compact Disc Read Only Memory), a CD-R (Recordable)/RW (ReWritable), or the like.

The disk interface 19 exchanges data with one or more disk devices 20. Each of the disk devices 20 is an HDD or an SSD (Solid State Drive), for example.

By such a hardware configuration as described above, it is possible to realize the processing functions of the RAID device 13 in the second embodiment. In addition, the host 11 and the control apparatus 1 in the first embodiment may be realized by hardware similar to the RAID device 13 illustrated in FIG. 3.

For example, the RAID device 13 realizes the processing functions in the second embodiment by executing programs stored in computer-readable storage media. The programs describing the contents of the processes to be executed by the RAID device 13 may be stored in various storage media. For example, the programs to be executed by the RAID device 13 may be stored in the HDD 17. In that case, the processor 15 loads at least some of the programs from the HDD 17 to the DRAM 16. Alternatively, the programs to be executed by the RAID device 13 may be stored in portable storage media such as an optical disc, a memory device, and a memory card. The programs stored in the portable storage media are installed into the HDD 17 and become executable under control of the processor 15, for example. Alternatively, the processor 15 may read the programs directly from the portable storage media.

Figure 4:
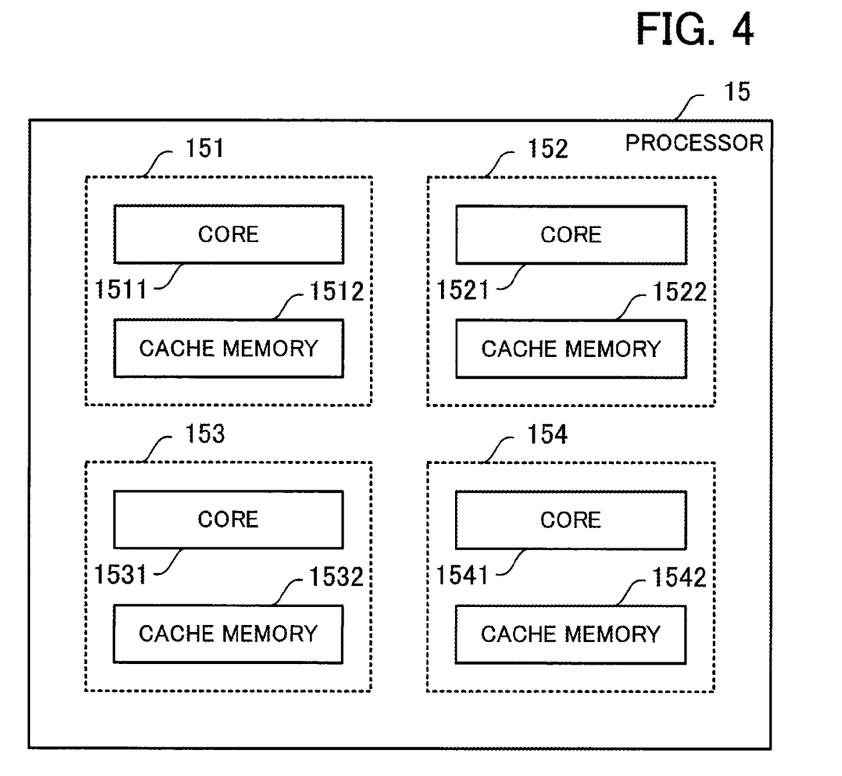

Next, a configuration of the processor 15 in the second embodiment will be described with reference to FIG. 4. FIG. 4 illustrates an example of the processor in the second embodiment.

The processor 15 is a multi-core processor, more specifically, a quad-core processor with four processor cores 151, 152, 153, and 154. In this example, the processor 15 is a quad-core processor, but the number of the cores is not limited to four as far as it is two or more. For example, the processor 15 may be a dual-core processor with two cores, a hexa-core processor with six cores, or an octa-core processor with eight cores.

The processor cores 151, 152, 153, and 154 include cores 1511, 1521, 1531, and 1541 and cache memories 1512, 1522, 1532, and 1542, respectively. Each of the cache memories 1512, 1522, 1532, and 1542 is a local cache memory occupied by one core.

The core 1511 uses the cache memory 1512 as a CPU cache not shared with the other cores 1521, 1531, and 1541. The core 1521 uses the cache memory 1522 as a CPU cache not shared with the other cores 1511, 1531, and 1541. The core 1531 uses the cache memory 1532 as a CPU cache not shared with the other cores 1511, 1521, and 1541. The core 1541 uses the cache memory 1542 as a CPU cache not shared with the other cores 1511, 1521, and 1531.

The RAID device 13 assigns host I/O processes to the processor cores 151, 152, 153, and 154. The processor cores 151, 152, 153, and 154 execute the host I/O processes involving management of cache pages used in the processes. Therefore, each of the processor cores 151, 152, 153, and 154 executes the assigned host I/O processes involving access to the shared cache memory for management of cache pages.

Figure 5:
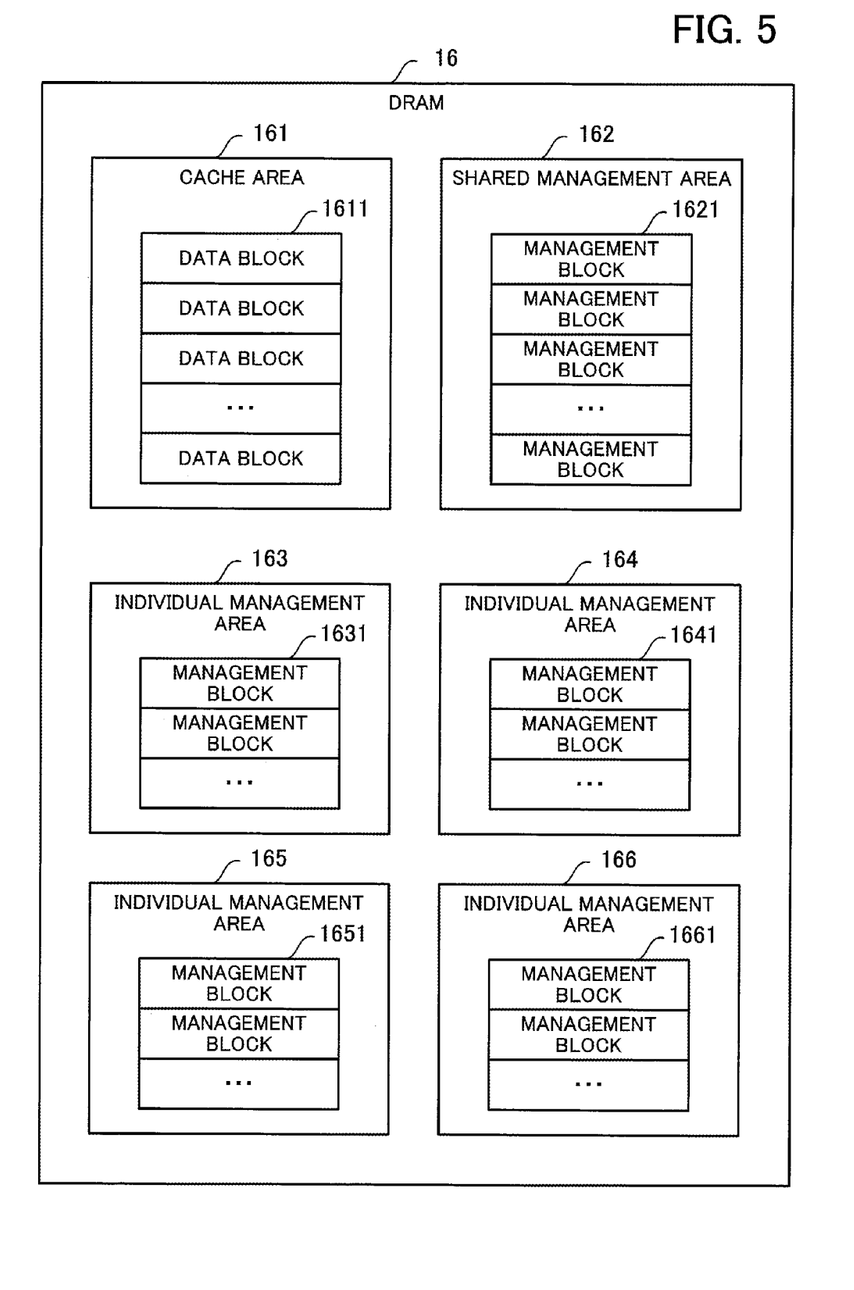

Next, a memory space in the DRAM 16 in the second embodiment will be described with reference to FIG. 5. FIG. 5 illustrates an example of the memory space in the DRAM in the second embodiment.

The DRAM 16 includes a cache area 161, a shared management area 162, and individual management areas 163, 164, 165, and 166. The cache area 161 is a storage area that serves as a shared cache memory among the cores 1511, 1521, 1531, and 1541. The cache area 161 is divided into a plurality of data blocks 1611. Each of the data blocks 1611 corresponds to a cache page (unit data).

The shared management area 162 is an area for management of management blocks 1621. Each of the management blocks 1621 is management information for the corresponding data block 1611. The shared management area 162 is accessible from the cores 1511, 1521, 1531, and 1541. The shared management area 162 is a storage area that serves as a shared queue in the shared cache memory.

The individual management area 163 is an area for management of management blocks 1631. Each of the management blocks 1631 is management information for the corresponding data block 1611. The individual management area 163 is accessible from the core 1511. The individual management area 163 is a storage area that serves as a local queue in the shared cache memory.

The individual management area 164 is an area for management of management blocks 1641. Each of the management blocks 1641 is management information for the corresponding data block 1611. The individual management area 164 is accessible from the core 1521. The individual management area 164 is a storage area that serves as a local queue in the shared cache memory.

The individual management area 165 is an area for management of management blocks 1651. Each of the management blocks 1651 is management information for the corresponding data block 1611. The individual management area 165 is accessible from the core 1531. The individual management area 165 is a storage area that serves as a local queue in the shared cache memory.

The individual management area 166 is an area for management of management blocks 1661. Each of the management blocks 1661 is management information for the corresponding data block 1611. The individual management area 166 is accessible from the core 1541. The individual management area 166 is a storage area that serves as a local queue in the shared cache memory.

Figure 6:
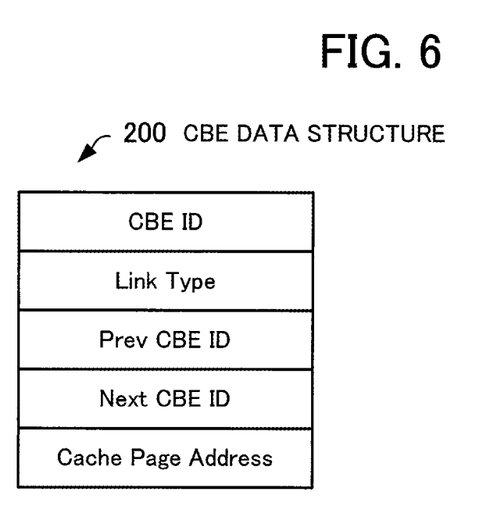

Next, descriptions will be given as to data structure of the management blocks 1621, 1631, 1641, 1651, and 1661 in the second embodiment with reference to FIG. 6. FIG. 6 illustrates an example of the management block data structure in the second embodiment.

The management blocks 1621, 1631, 1641, 1651, and 1661 correspond to CBEs. Each of the CBEs has a data structure described as a CBE data structure 200. The CBEs are management information that corresponds one by one to the data blocks 1611. The CBE structure 200 includes CBE ID (IDentification), Link Type, Prev CBE ID, Next CBE ID, and Cache Page Address.

The CBE ID is identification information for uniquely indicating the CBE. The CBE ID is sequential numerical information, for example.

The Link Type is information indicative of the kind of a CBE link. The Link Type may be Free Link, LRU Link, LTS (Link TimeShift) Buffer, or the like. The Free Link refers to a link in which unused CBEs are connected. The LRU Link refers to a link in which CBEs used in a shared queue are connected according to LRU. The LTS Buffer refers to a link in which CBEs used in a local queue are connected according to LRU.

The Prev CBE ID is the CBE ID of a CBE connected before the CBE. The Next CBE ID is the CBE ID of a CBE connected after the CBE. The Prev CBE ID and the Next CBE ID are connection information indicative of connection relationship between the CBEs.

The Cache Page Address is the address of the corresponding data block 1611.

Figure 7:
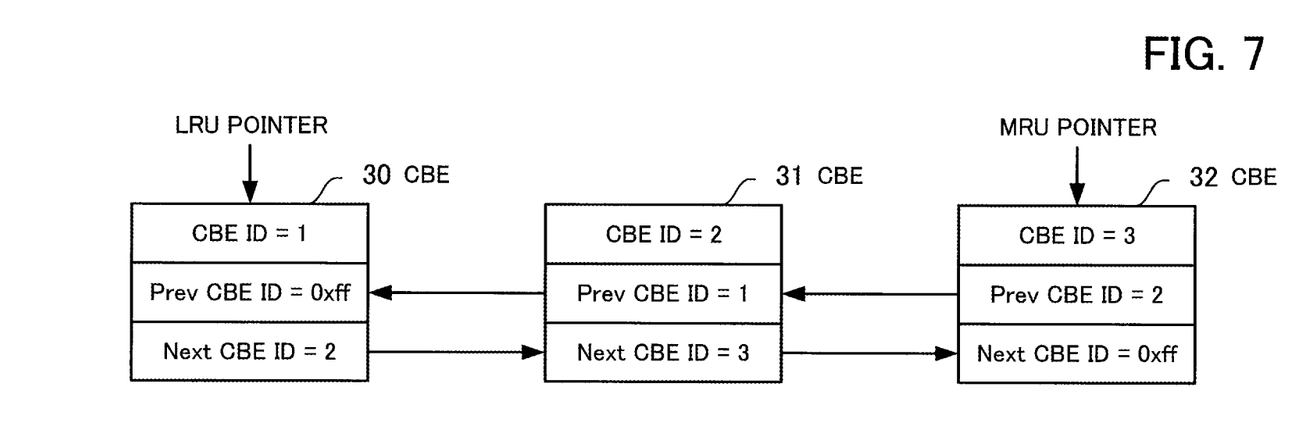

Next, a CBE link in the second embodiment will be described with reference to FIG. 7. FIG. 7 illustrates an example of the CBE link in the second embodiment.

The management blocks 1621, 1631, 1641, 1651, and 1661 are the same in structure as the CBE link illustrated in FIG. 7. The CBE link includes CBEs 30, 31, and 32. For the sake of simplification, for the CBEs 30, 31, and 32, only the CBE ID, the Prev CBE ID, and the Next CBE ID will be described and other information will be omitted.

For the CBE 30, the CBE ID is 1, the Prev CBE ID is 0xff, and the Next CBE ID is 2. For the CBE 31, the CBE ID is 2, the Prev CBE ID is 1, and the Next CBE ID is 3. For the CBE 32, the CBE ID is 3, the Prev CBE ID is 2, and the Next CBE ID is 0xff. The Prev CBE ID of 0xff and the Next CBE ID of 0xff indicate that there is no CBE as a destination of connection.

According to the foregoing information, for the CBE 30, no CBE is connected before the CBE 30 and the CBE 31 is connected after the CBE 30. For the CBE 31, the CBE is connected before the CBE 31 and the CBE 32 is connected after the CBE 31. For the CBE 32, the CBE 31 is connected before the CBE 32 and no CBE is connected after the CBE 32.

The CBE 30 at the tail end of the CBE link is pointed to by an LRU pointer. The CBE 32 at the beginning of the CBE link is pointed to by an MRU pointer. The CBEs 30, 31, and 32 form a queue of a bi-directional list structure.

For example, when a new CBE (with the CBE ID of 4) is connected to the link, the MRU pointer is updated to point to the new CBE instead of the CBE 30, and the CBE 30 is updated to change the Prev CBE ID from 0xff to 4.

In addition, when the CBE 31 is newly connected to the link, the CBE 31 already existing in the link is deleted. That is, the CBE 30 is updated to change the NextCBE ID from 2 to 3, and the CBE 32 is updated to change the Prev CBE ID from 2 to 1. In addition, the MRU pointer is updated to point to the CBE 31 instead of the CBE 30, and the CBE 30 is updated to change the Prev CBE ID from 0xff to 2.

Figure 8:
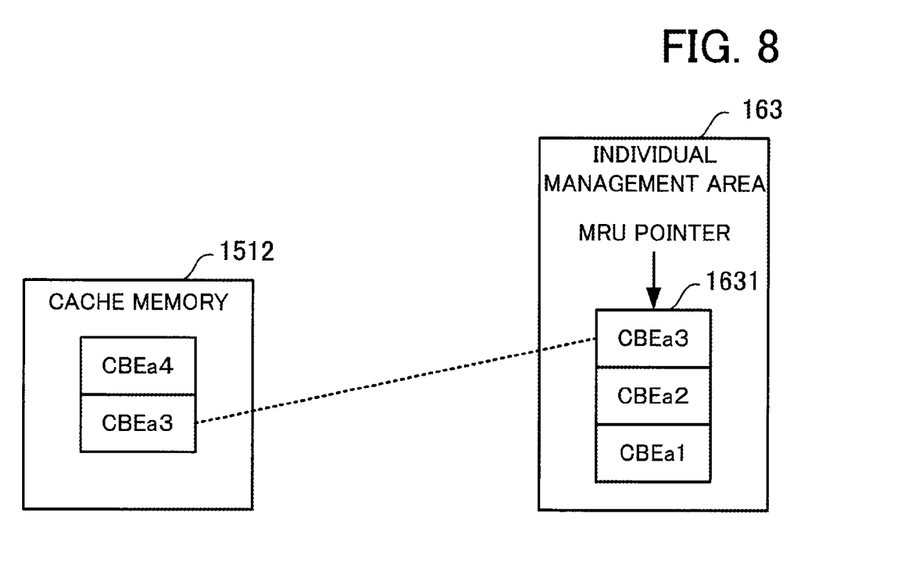

Next, descriptions will be given as to a cache hit in a cache memory occupied by a core in the second embodiment with reference to FIG. 8. FIG. 8 illustrates an example of the cache hit in the cache memory occupied by the core in the second embodiment.

The cache memory 1512 is occupied by the core 1511. The core 1511 connects a management block CBEa4 for a cache page used in a process to the management block 1631 in the individual management area 163. At that time, the core 1511 refers to a CBEa3 pointed to by the MRU pointer for connection of the CBEa4 to the management block 1631. Since the CBEa3 is also a management block for a cache page used by the core 1511 in a process, the CBEa3 is located in the cache memory 1512. That is, the core 1511 hits the cache memory 1512. This cache hit is a CPU cache hit and thus the core 1511 improves the processor in processing performance.

Figure 9:
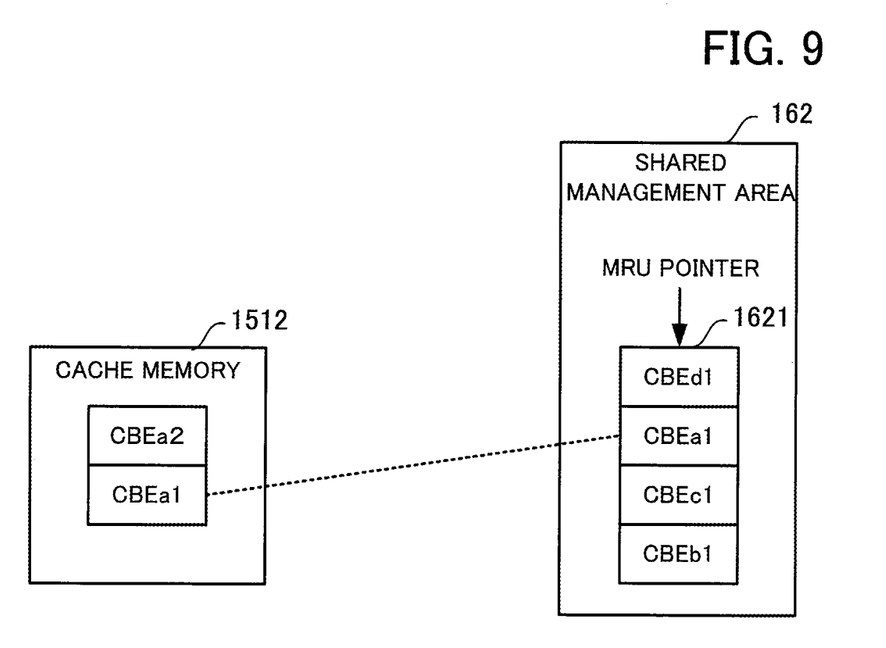

Hereinafter, a comparison with a reference example will be made with reference to FIG. 9. FIG. 9 illustrates a comparative example of a cache miss in a cache memory occupied by a core in the case where no individual management area is provided for each of cores.

In the following description, the comparison example is based on the assumption that a CBEa2 as a management block for a cache page used by the core 1511 in a process is connected to the management block 1621 in the shared management area 162 not via the individual management area 163. The management blocks with codes beginning at CBEa in the shared management area 162 are management blocks for cache pages used by the core 1511 in processes. The management blocks with codes beginning at CBEb, CBEc, and CBEd are management blocks for cache pages used by cores other than the core 1511.

The core 1511 connects the CBEa2 to the management block 1621 in the shared management area 162. At that time, the core 1511 refers to a CBEd1 pointed to by the MRU pointer for connection of CBEa2 to the management block 1621. Since the CBEd1 is not a management block for a cache page used by the core 1511, the CBEd1 is not located in the cache memory 1512. That is, the core 1511 misses the cache memory 1512.

Accordingly, the core 1511 needs to make access to the DRAM 16. This cache miss is a CPU cache miss, and thus the core 1511 does not improve the processor in processing performance. Such a CPU cache miss becomes more prominent with increase in the number of cores in the processor. Recent years' trend toward increase in the number of cores has led to growing demands for preventive measures to avoid deterioration in the processing performance of the processor due to CPU cache misses.

Meanwhile, the RAID device 13 improves the processor in processing performance by CPU cache hits with the individual management areas 163, 164, 165, and 166 provided for the cores 1511, 1521, 1531, and 1541, respectively.

Figure 10:
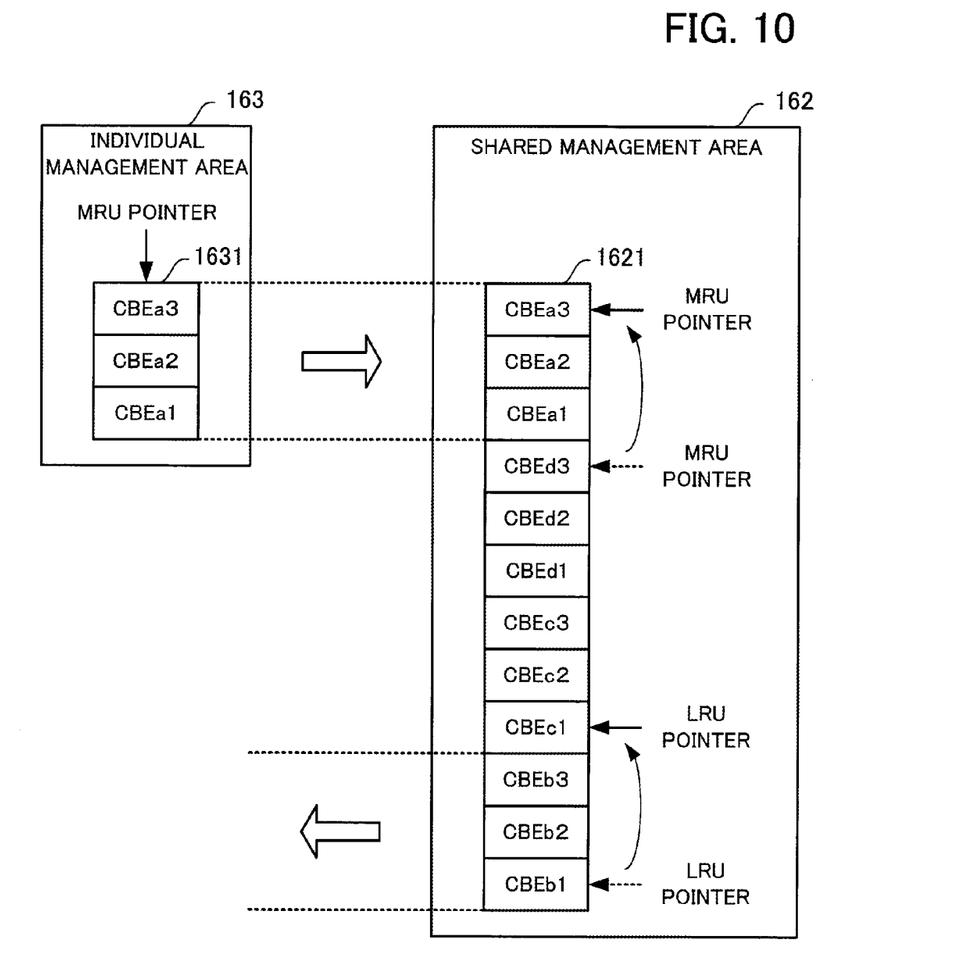

Next, descriptions will be given as to reconnection of management blocks from an individual management area to the shared management area in the second embodiment with reference to FIG. 10. FIG. 10 illustrates an example of reconnection of management blocks from the individual management area to the shared management area.

The core 1511 accumulates CBEa1, CBEa2, and CBEa3 in the individual management area 163. While accumulating CBEa2 and CBEa3 in the individual management area 163, the core 1511 makes a cache hit because CBEa1 and CBEa2 to be referred are located in the cache memory 1512. In such a manner, the RAID device 13 increases the cache hit ratio by accumulating CBEa1, CBEa2, and CBEa3 in the individual management area 163.

The core 1511 then reconnects CBEa1, CBEa2, and CBEa3 accumulated in the individual management area 163 from the management block 1631 to the management block 1621 in the shared management area 162. At that time, the core 1511 connects CBEa1, CBEa2, and CBEa3 to the tail end of the management block 1621 to update the MRU pointer.

When there is no usable CBE in a host I/O process, the core 1511 ejects cache pages. At that time, the core 1511 ejects the CBEs pointed to by the LRU pointer from the management block 1621 to update the LRU pointer.

Figure 11:
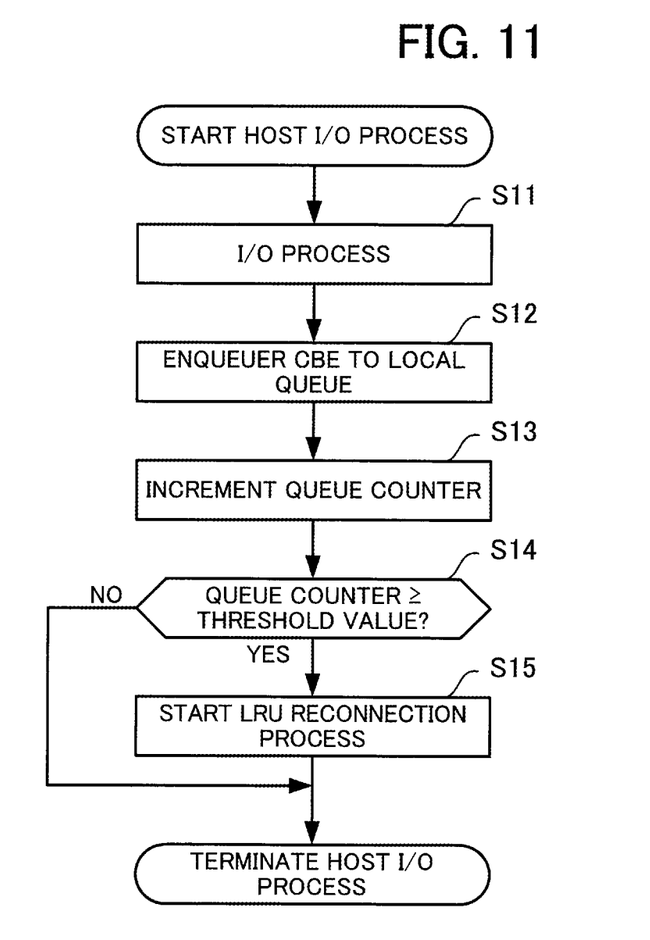

Next, a host I/O process in the second embodiment will be described with reference to FIG. 11. FIG. 11 illustrates a flowchart of the host I/O process in the second embodiment.

The host I/O process is a process for executing an I/O process corresponding to an I/O request from the host 11 and connecting a CBE for a cache page involved in the I/O process to a queue. The host I/O process is executed by a core to which the host I/O process is assigned. In the following description, the core 1511 is assigned the host I/O process, but the same thing is applicable to the cores 1521, 1531, and 1541.

[Step S11] The core 1511 executes the I/O process corresponding to the I/O request from the host 11. The I/O process corresponding to the I/O request includes reading of data form the disk device 20, writing of data into the disk device 20, and the like, for example.

[Step S12] The core 1511 enqueues the CBE for the cache page involved in the I/O process to the local queue. Specifically, the core 1511 connects the CBE as a management block for the cache page used in the process to the management block 1631 in the individual management area 163.

[Step S13] The core 1511 increments a queue counter. The queue counter indicates the number of CBEs connected to the management block 1631 in the individual management area 163.

[Step S14] The core 1511 determines whether the value on the queue counter is equal to or more than a threshold value. When the value on the queue counter is equal to or more than the threshold value, the core 1511 moves the process to step S15. When the value on the queue counter is smaller than the threshold value, the core 1511 terminates the host I/O process. The threshold value is a pre-decided value, but may be variable depending on environment variables such as the number of cores in the processor and the usage rate of the processor.

[Step S15] The core 1511 starts an LRU reconnection process and terminates the host I/O process. The core 1511 may start the LRU reconnection process by calling an LRU control function through a scheduler.

Figure 12:
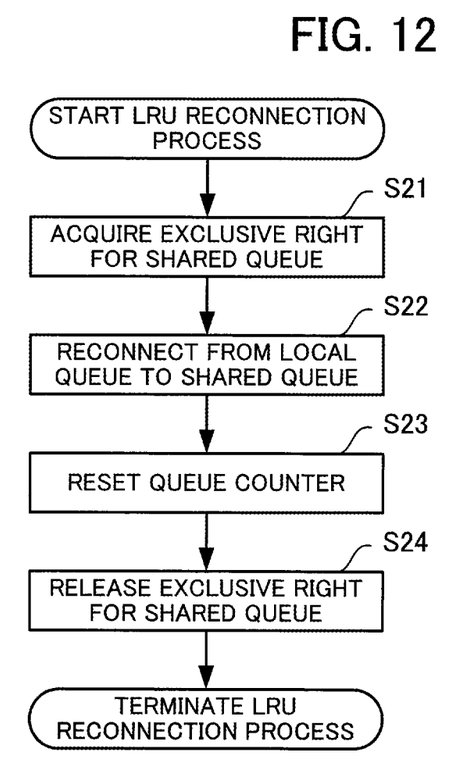

Next, the LRU reconnection process in the second embodiment will be described with reference to FIG. 12. FIG. 12 illustrates a flowchart of the LRU reconnection process in the second embodiment.

The LRU reconnection process is intended for reconnection of CBEs from a local queue to a shared queue. In the following description, the core 1511 calls the LRU control function, but the same thing is applicable to the cores 1521, 1531, and 1541. The LRU reconnection process is executed by the core 1511 upon calling of the LRU control function through the scheduler.

[Step S21] The core 1511 acquires the exclusive right for the shared queue. Specifically, the core 1511 acquires the exclusive right to access the shared management area 162.

[Step S22] The core 1511 reconnects the CBEs from the local queue to the shared queue. Specifically, the core 1511 reconnects the CBEs accumulated in the individual management area 163 from the management block 1631 to the management block 1621 in the shared management area 162.

[Step S23] The core 1511 resets the queue counter. Specifically, the core 1511 clears the queue counter back to zero.

[Step S24] The core 1511 releases the exclusive right for the shared queue. Specifically, the core 1511 releases the exclusive right to access the shared management area 162. After releasing the exclusive right for the shared queue, the core 1511 terminates the LRU reconnection process.

In the second embodiment, the individual management areas 163, 164, 165, and 166 serve as local queues, but may serve as buffers without a bi-directional list structure. In that case, the RAID device 13 may decide the sequence of CBEs accumulated in the individual management area 163 when reconnecting the CBEs from the management block 1631 to the management block 1621 in the shared management area 162.

In the second embodiment, the RAID device 13 assigns host I/O processes to the cores. When the host I/O processes are assigned evenly to the cores, the process power of the processor is further improved.

In the second embodiment, the RAID device 13 controls the timing for reconnection of the CBEs from the local queue to the shared queue with the use of the queue counter. However, the RAID device 13 is not limited to this configuration but may control the timing for reconnection under a predetermined condition. For example, the RAID device 13 may control the timing for reconnection with satisfaction of preset conditions such as the staying time of CBEs in the local queue and the number of host I/O processes.

In the foregoing description, each of the cores occupies a local queue. Alternatively, two or more local queues may be provided and one of the local queues may be shared between two or more local queues. For example, when the RAID device 13 assigns host I/O processes unevenly to the cores, a core assigned a larger number of processes occupies one local queue and cores assigned a smaller number of processes share one local queue.

The foregoing processing capabilities can be realized by a computer. In that case, programs describing the contents of functions to be performed by the control apparatus 1 and the RAID device 13 are provided. The programs are executed by the computer to realize the foregoing processing functions on the computer. The programs describing the contents of the processes may be recorded in computer-readable storage media. The computer-readable storage media include a magnetic storage device, an optical disc, a magneto-optical storage medium, a semiconductor memory, and the like. The magnetic recording devices include a hard disk device (HDD), a flexible disk (FD), a magnetic tape, and the like. The optical discs include a DVD, a DVD-RAM, a CD-ROM/RW, and the like. The magneto-optical storage media include an MO (Magneto-Optical disc), and the like.

To distribute the programs, portable storage media storing the programs such as DVDs or CD-ROMs are sold, for example. Alternatively, the programs may be stored in advance in a storage device of a server computer such that the programs are transferred from the server computer to other computers via a network.

To execute the programs on a computer, the programs stored in the portable storage medium or transferred from the server computer are stored in a storage device of the computer. Then, the computer reads the programs from its storage device and executes processes according to the programs. Alternatively, the computer may read the programs directly from the portable storage media and execute processes according to the programs. Still alternatively, whenever the programs are transferred to the computer from the server computer connected via a network, the computer may execute processes according to the received programs.

At least some of the foregoing processing capabilities may be realized by electronic circuits such as a DSP, ASIC, and PLD.

In one aspect of the embodiments, a control apparatus, a control program, and a control method improve the cache hit ratio of the local cache in the multi-core processor.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A control apparatus, comprising:
a processor including two or more processor cores each including a local cache memory; and
a physical memory different from the local cache memory of each processor core, the physical memory including:
individual management areas respectively associated with the processor cores,
a shared management area configured to receive outputs of the individual management areas, and
a shared cache memory area for shared use by the processor cores to store data blocks,
the processor performs a procedure including:
enqueuing a management block to one of the individual management areas, the management block indicating address of a data block to be sent to the shared cache memory area,
dequeuing a group of management blocks from the one of the individual management areas, the group of management blocks having been formed as a result of repetition of the enqueuing of a management block, and
enqueuing the dequeued group of management blocks to the shared management area, such that the management blocks belonging to the dequeued group successively align in the shared management area.

2. The control apparatus according to claim 1, wherein the dequeuing is performed when a number of management blocks stored in the one of the individual management areas has reached a predetermined number.

3. The control apparatus according to claim 1, wherein each management block in the one of the individual management areas includes information indicative of links with preceding and following management blocks.

4. The control apparatus according to claim 1, wherein the procedure further includes assigning processes involving access to the shared cache memory area distributedly to the processor cores.

5. The control apparatus according to claim 4, wherein the procedure further includes accepting I/O processes for a storage device and assigning the I/O processes distributedly to the processor cores.

6. The control apparatus according to claim 1, wherein:
the individual management areas serve as a buffer for temporarily storing management blocks to be sent to the shared management area, and
the dequeuing is performed when a predetermined condition is satisfied
in the one of the individual management areas.

7. The control apparatus according to claim 1, wherein the procedure further includes performing Least Recently Used (LRU) control with respect to management blocks stored in the shared management area to manage replacement of data blocks in the shared cache memory area.

8. A non-transitory computer-readable storage medium storing a control program that causes a control apparatus to perform a procedure comprising:
forming memory areas in a physical memory different from local cache memories of processor cores in the control apparatus, the memory areas including:
individual management areas being respectively associated with the processor cores,
a shared management area configured to receive outputs of the individual management areas, and
a shared cache memory area for shared use by the processor cores to store data blocks;
enqueuing a management block to one of the individual management areas, the management block indicating address of a data block to be sent to the shared cache memory area;
dequeuing a group of management blocks from the one of the individual management areas, the group of management blocks having been formed as a result of repetition of the enqueuing of a management block; and
enqueuing the dequeued group of management blocks to the shared management area, such that the management blocks belonging to the dequeued group successively align in the shared management area.

9. A control method comprising:
forming, by a control apparatus, memory areas in a physical memory different from local cache memories of processor cores in the control apparatus, the memory areas including:
individual management areas being respectively associated with the processor cores,
a shared management area configured to receive outputs of the individual management areas, and
a shared cache memory area for shared use by the processor cores to store data blocks;
enqueuing, by the control apparatus, a management block to one of the individual management areas, the management block indicating address of a data block to be sent to the shared cache memory area;
dequeuing, by the control apparatus, a group of management blocks from the one of the individual management areas, the group of management blocks having been formed as a result of repetition of the enqueuing of a management block; and
enqueuing, by the control apparatus, the dequeued group of management blocks to the shared management area, such that the management blocks belonging to the dequeued group successively align in the shared management area.

* * * * *